United States Patent
Yamaga et al.

(10) Patent No.: US 6,614,475 B1
(45) Date of Patent: Sep. 2, 2003

(54) CORRECTION APPARATUS AND METHOD FOR IMAGING SIGNALS AND VIDEO CAMERA

(75) Inventors: Satoshi Yamaga, Kanagawa (JP); Seiji Sato, Kanagawa (JP); Keiichi Ito, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/214,737

(22) PCT Filed: May 13, 1998

(86) PCT No.: PCT/JP98/02117
§ 371 (c)(1),
(2), (4) Date: Apr. 12, 1999

(87) PCT Pub. No.: WO98/52352
PCT Pub. Date: Nov. 19, 1998

(30) Foreign Application Priority Data

May 13, 1997 (JP) .............................................. 9-122448

(51) Int. Cl.$^7$ .............................................. H04N 5/202
(52) U.S. Cl. .................................................... 348/254
(58) Field of Search .................................. 348/254, 253, 348/257, 241, 222.1, 588, 594, 688, 687, 649, 692, 615, 187, 251, 256; 358/447, 518, 519, 520; 382/274

(56) References Cited

U.S. PATENT DOCUMENTS

| | | | | |
|---|---|---|---|---|
| 4,285,004 A | * | 8/1981 | Morrison et al. ............ | 348/251 |
| 4,302,777 A | * | 11/1981 | Kemner et al. ............. | 348/688 |
| 4,589,019 A | * | 5/1986 | Dischert et al. ............ | 348/688 |
| 5,185,666 A | * | 2/1993 | Capitant et al. ............ | 348/588 |
| 5,221,963 A | * | 6/1993 | Hashimoto et al. ....... | 348/229.1 |
| 5,280,354 A | * | 1/1994 | Nakamura .................... | 348/688 |
| 5,410,365 A | * | 4/1995 | Nakamura et al. .......... | 348/692 |
| 6,088,059 A | * | 7/2000 | Mihara et al. ............... | 348/241 |
| 6,111,607 A | * | 8/2000 | Kameyama .................. | 348/256 |
| 6,414,714 B1 | * | 7/2002 | Kurashige et al. ......... | 348/229.1 |

FOREIGN PATENT DOCUMENTS

| | | |
|---|---|---|
| JP | 61-13888 | 1/1986 |
| JP | 61-263373 | 11/1986 |
| JP | 4-313966 | 11/1992 |

* cited by examiner

*Primary Examiner*—Aung S. Moe
(74) *Attorney, Agent, or Firm*—Frommer Lawrence & Haug LLP; William S. Frommer; Gordon Kessler (57) ABSTRACT

An average signal level of imaging signals obtained by a solid-state image pickup device of an image pickup unit 112 is detected by an average signal level detection circuit 116. Based on APL (average picture level) data specifying the average signal level APL as detected by this average signal level detection circuit 116, a system control micro-computer 117 refers to a table of an average signal level versus correction level finction specifying the correction level in the plural average signal levels previously stored in a memory 118 to read out flare correction data conforming to the APL data. A D/A-LPF circuit 119 converts the flare correction data by digital/analog (D/A) conversion to generate flare correction data, which are summed by adders 114R, 114G and 114B to imaging signal obtained by said solid-state image pickup device.

14 Claims, 9 Drawing Sheets

(PRIOR ART)

FIG.4

(PRIOR ART)

(PRIOR ART)

FIG.10

CORRECTION APPARATUS AND METHOD FOR IMAGING SIGNALS AND VIDEO CAMERA

DESCRIPTION

Correction Apparatus and Method for Imaging Signals and Video Camera

TECHNICAL FIELD

This invention relates to a correction method and apparatus for imaging signals for flare correction and a video camera having the flare correcting finction.

BACKGROUND ART

Heretofore, in a video camera in which an image of an object formed on an imaging surface of an image pickup device by the imaging light incident thereon via an image pickup optical system is converted into electrical signals, which electrical signals are outputted as image pickup signals, a phenomenon termed flare is sometimes produced. This flare is a phenomenon in which the incident light is reflected by an image pickup surface or plural lenses of a zoom lens unit to fall on an image pickup device to raise (or float) the signal level of dark portions of the image (the signal level of the entire image) than an actual level. In particular, a lead oxide (PbO) layer forming a photoelectric conducting surface of a photoelectrically conductive image pickup tube used in a conventional video camera, absorbs the red light to a lesser extent and reflects it, this reflected light being reflected by a surface plate glass to be reincident on the PbO layer to raise the signal level of the dark portion or to cause flare responsible for color distortion, all in a well-known manner.

For this reason, it is practiced in the video camera to correct the above flare. The correction level necessary for flare correction, that is the 0 flare correction level, is said to be proportionate to the average value of the incident light volume, that is proportionate to the average picture level APL. Therefore, the flare correction circuit loaded on the video camera integrates picture signals obtained from an image pickup device to detect the APL and subtracts the APL multiplied by a preset coefficient as the flare correction level from the original image to prevent the signal level of the dark portion from being increased.

Figure 1:
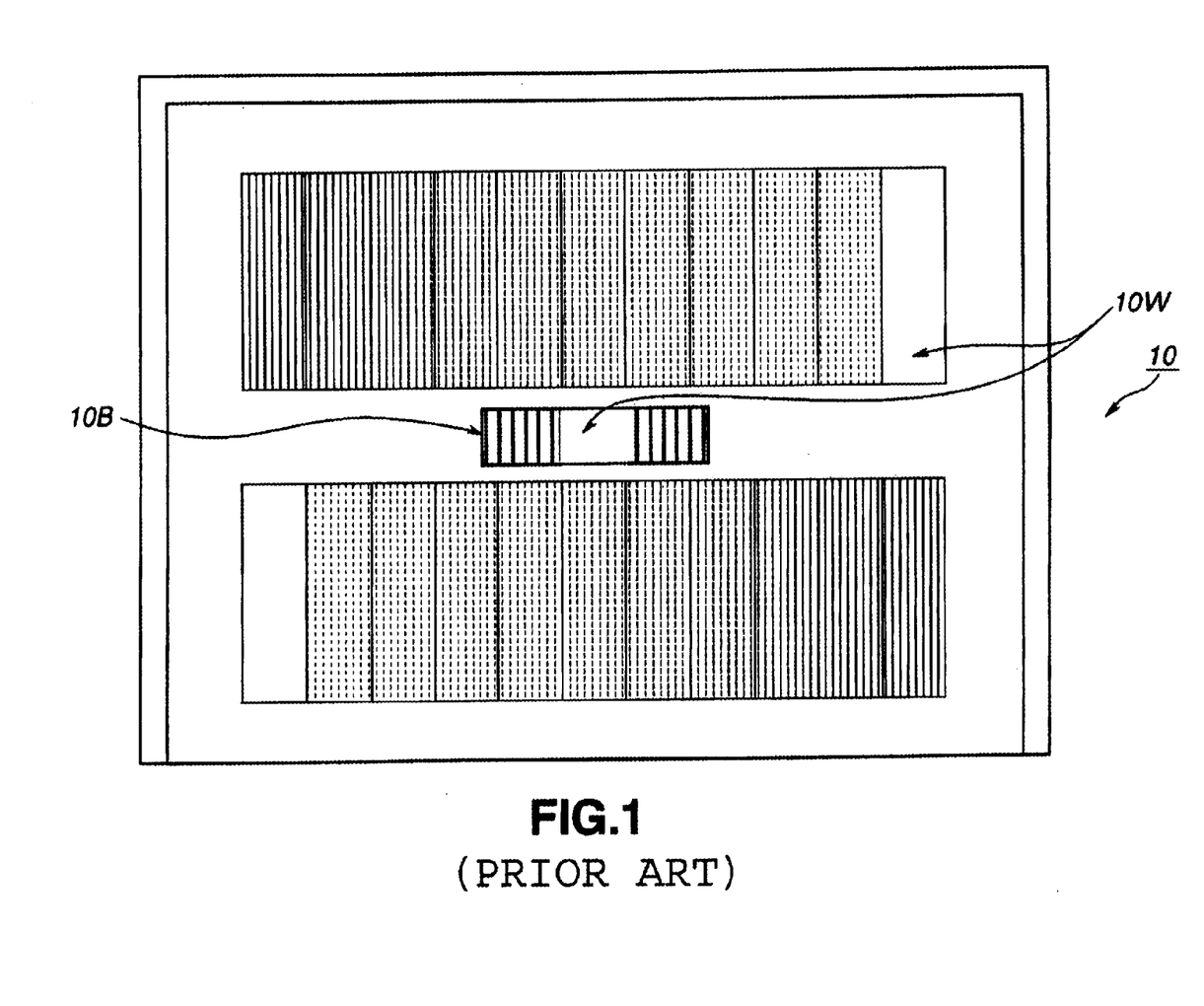
FIG. 1 is a front view showing an example of a gray scale chart used for video camera adjustment.

In a video camera used in, for example, a broadcasting station, camera adjustment is made using a gray scale chart 10 as shown in FIG. 1. This gray scale chart is prepared by bonding a paper sheet with a prescribed reflectance on a 4:3 picture frame. A 11-stage or a 9-stage gray scale chart is commonly used. The gray scale chart 10 shown in FIG. 1 is a 11-stage gray scale and has a reflectance of a white area 10W with the maximum reflectance of 89.9% and has a reflectance of a black area 10B with the maximum reflectance of 2%.

Using the gray scale chart 10, the white portion is matched to 100% of the picture signal level (100 IRE (Institute for Radio Engineers)). A video engineer (VE) of a broadcasting station performs gamma correction, knee point adjustment or flare correction required for video camera setup, before starting the program recording or relaying.

Figure 2:
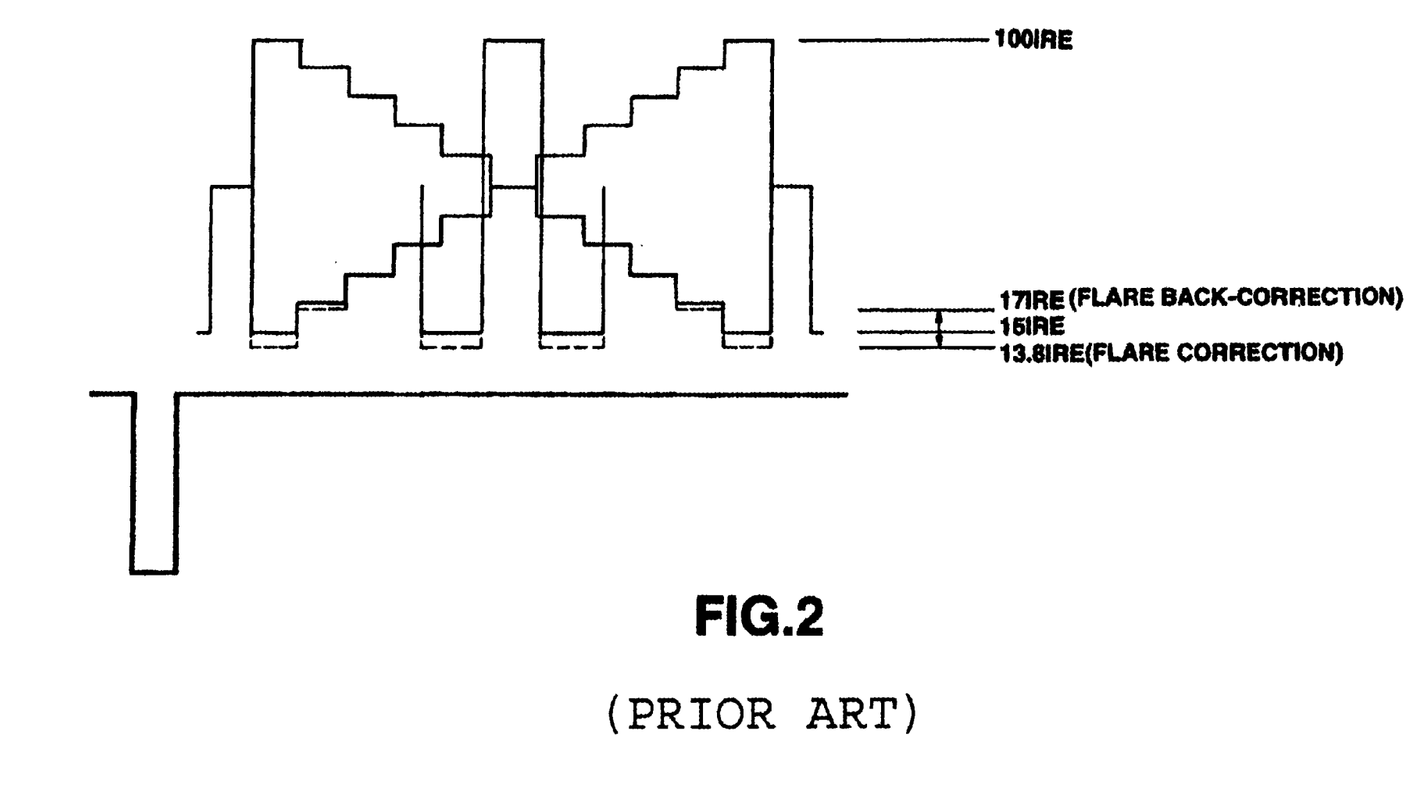
FIG. 2 is a signal waveform showing a signal waveform, as observed by a video camera, of imaging signals obtained on imaging the above gray scale chart by a routine video camera.
Figure 3:
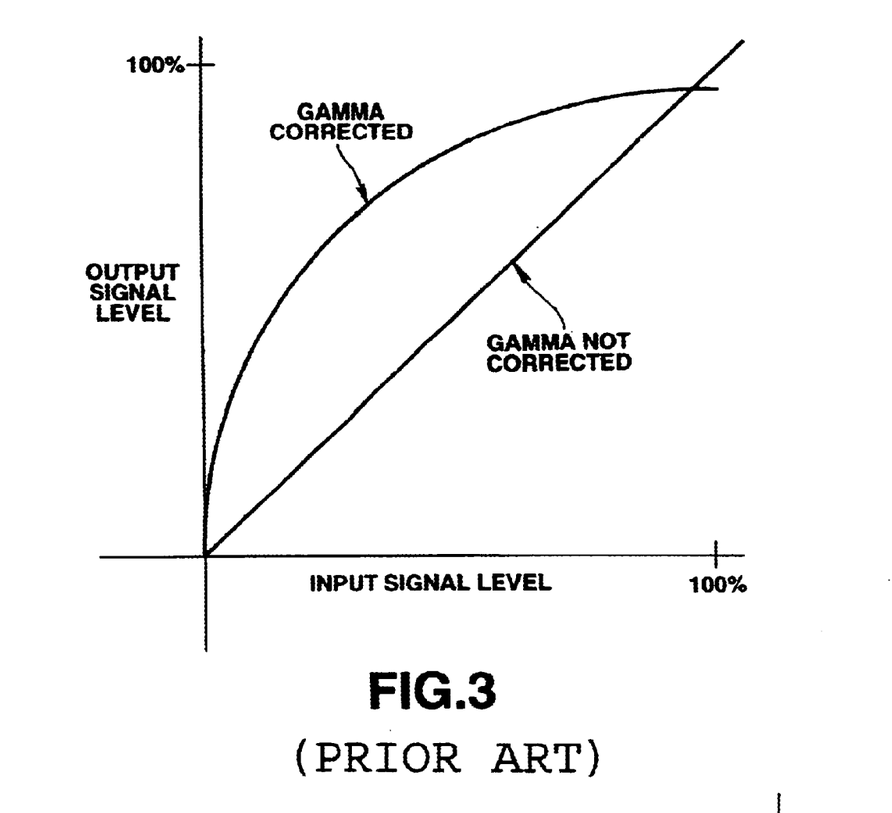
FIG. 3 is a graph for illustrating the gamma correction of picture signals.

The signal waveform of image signals, obtained on imaging with a routine video camera, and observed by a measurement equipment, termed a waveform monitor, is shown in FIG. 2.

In the image signals of the signal waveform, shown in FIG. 2, the white portion corresponding to the white area 10W, has the maximum signal level. If this signal level is adjusted to 100 IRE, the signal level of the black portion corresponding to the black area 10B is 100×2/89.9=2.2 IRE.

However, in an actual video camera, the vicinity of the black level is amplified by a factor of approximately four by gamma correction. There is also a function termed a pedestal in which the complete black level is not set to 0 IRE but the signal level is raised to prevent collapsing of the black and its vicinity, such that, in the total absence of the incident light, pedestal level of the order of approximately 51 RE is added. There is also produced a phenomenon, termed flare, in which he black level is slightly floated by the flare effect caused by the random scattering of the incident light in the inside of the lens or on the imaging surface. Thus, the black level in the signal waveform of the imaging signals is approximately 2.2×4+5+ flare effect or 15 IRE.

Since the flare inherently ins proportionate to the average value of the incident light volume, that is the average picture level (APL), the APL is detected by integrating the picture signals obtained from the image pickup device and the APL thus detected is multiplied with the flare correction coefficient to give a flare correction level which is then subtracted from the original picture signals to correct the flare.

Specifically, with the signal waveform of the imaging signals, shown in FIG. 2, the black level is of the order of 15 IRE due to the flare effect of approximately 1.2%. In the incident light volume which gives the signal waveform of the image pickup signals shown in FIG. 2, the flare correction level of 1.2 IRE obtained on multiplying the APL of the imaging signal with the flare correction coefficient is subtracted from 15 IRE to give the black level of 13.8 IRE. With a video camera having the flare correction function, the flare correction level is doubled in a manner corresponding to the doubled flare effect, even if the iris is opened by one throttle level to give an excess incident light volume. Thus, the flare effect can be canceled to maintain the black level at 2×(2.2× 4)+5=22.6 IRE.

Figure 5:
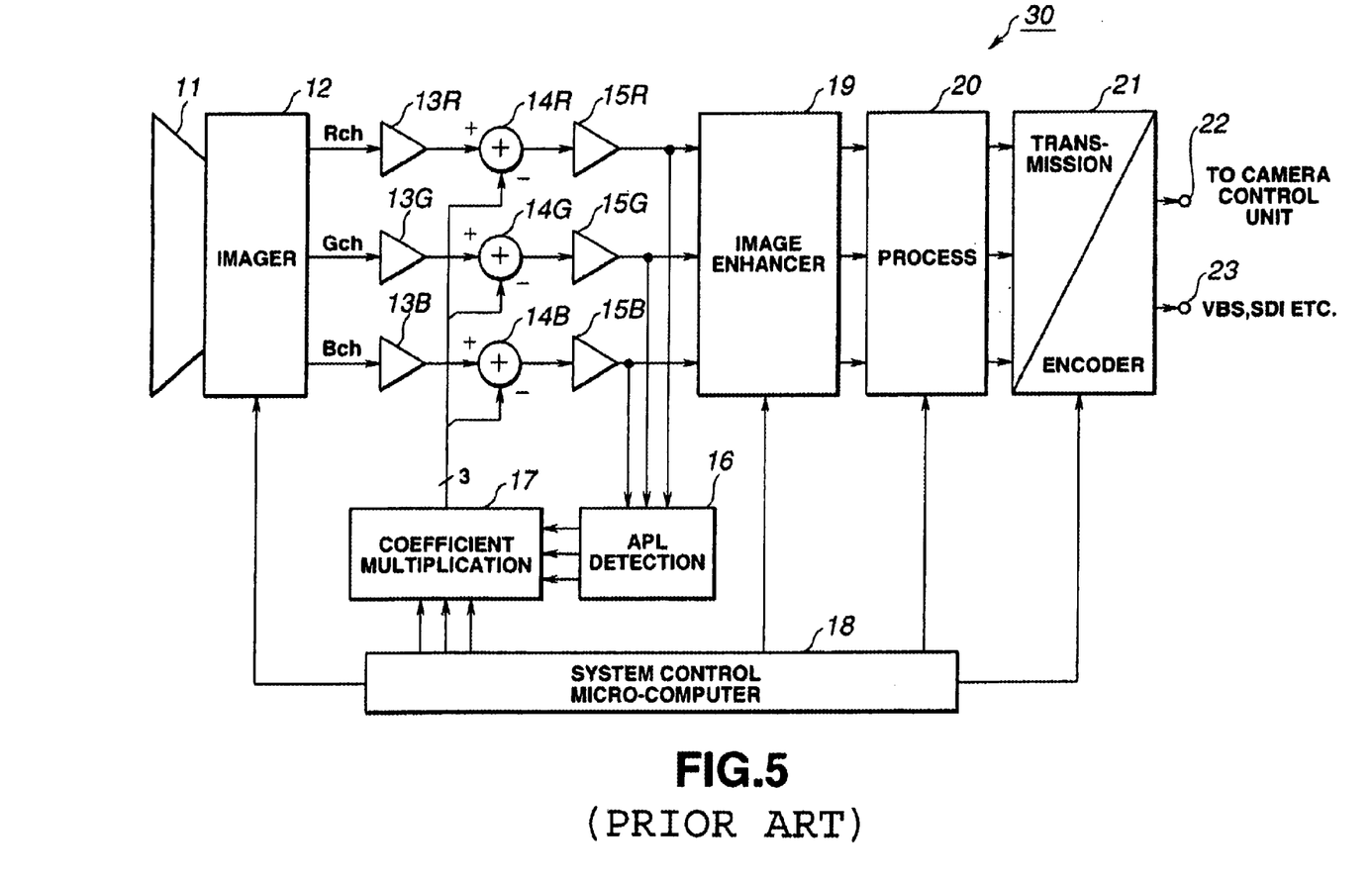
FIG. 5 is a block circuit diagram-showing a schematic structure of a video camera having the conventional flare correction function.

The structure of a video camera having a conventional flare correction function is shown in FIG. 5.

In a color video camera 30 shown in FIG. 5, the light from an object, incident via an image pickup lens optical system 11 on an image pickup unit 12, is separated by a color separation prism, not shown, in the image pickup unit 2, to give three color beams, that is red (R), green (G) and blue (B) beams, which are incident on associated image pickup devices, not shown. The image pickup devices, associated with R, G and B, convert the incident light beams R, G and B into electrical signals (imaging signals of the respective color components). The imaging signals of the respective color components from the image pickup devices are amplified by amplifiers in the image pickup unit 12 to output signals of a require signal level which are outputted.

The output imaging signals of the image pickup unit 12 are sent to associated variable gain amplifiers 13R, 13G and 13B where the imaging signals are adjusted for white balance so that the white portion of the object will be of the correct white color, that is so that, for imaging signals of the respective colors obtained from the white portion of the object, correct white color picture signals will be obtained on subsequent conversion of the imaging signals into picture signals. The imaging signals outputted from these variable gain amplifiers 13R, 13G and 13B are entered to subtractors 14R, 14G and 14B.

The output signals from the subtractors 14R, 14G and 14B are sent via associated amplifiers 15R, 15G and 15b to an APL detection circuit 16 and to an image enhancer 19.

This APL detection circuit 16 integrates the imaging signals of the respective color components R, G and B over several frames to detect an average signal level APL of the imaging signals associated with the respective color components. The APL signals associated with the respective color componentsas detected by the APL detection circuit 16 are sent to a coefficient multiplication circuit 17.

Figure 6:
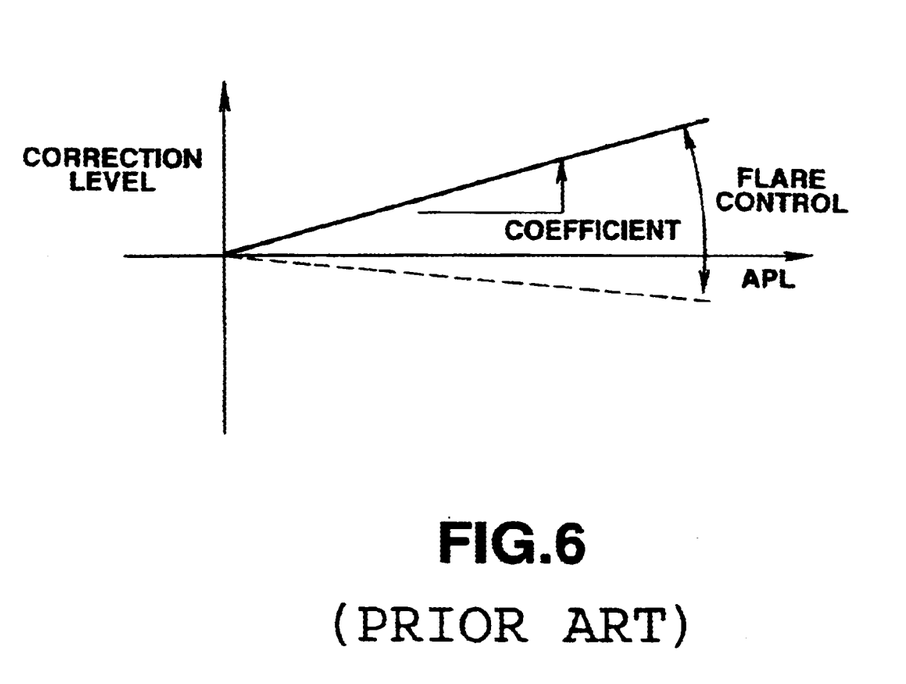
FIG. 6 is a graph for illustrating the flare control of a conventional video camera.

This coefficient multiplication circuit 17 multiplies the APL signals as found from one color component to another with the flare correction coefficients associated with the respective color components supplied from a system control micro-computer 18. The product values resulting from multiplication by the coefficient multiplication circuit 17 represent the flare correction levels associated with the respective color components. The relation between the APL signals, the flare coefficients multiplied with the APL signals and the flare correction level is shown in FIG. 6, in which the ordinate and the abscissa stand for the flare correction level and the APL values, respectively.

The flare correction signals, representing the flare correction level corresponding to the respective color components obtained by the coefficient multiplication circuit 17, are sent to the subtractors 14R, 14G and 14B fed with the imaging signals from the variable gain amplifiers 13R, 13G and 13B, that is the original imaging signals. The output signals of the subtractors 14R, 14G and 14B are adjusted in level by the associated amplifiers 15R, 15G and 15B and thence supplied to the APC detection circuit 16 and to the image enhancer 19.

This image enhancer 19 is used to enhance the edge for the contour of an image, if need be, to improve the picture quality. The signals of the respective color components, improved in picture quality (enhanced in contour) by this image enhancer 19 are sent to a process circuit 20 which then adds a pedestal level to the picture signals and performs so-called knee correction, gamma correction or white clipping on the picture signals having the pedestal level added thereto to send the resulting signals to a transmission/encoder circuit 21 of the next stage.

A transmitting portion and an encoding portion of the transmission/encoder circuit 21 are used for transmitting signals imaged by the camera to a camera control unit (CCU), not shown, and for processing the imaging signals of the R, G and B components for conformity to different signal standards. The signals from the transmuting portion are sent via a terminal 22 to the camera control unit, while those from the encoder portion are sent as VBS signals, that is as analog composite signals, or as SDI signals, that is serial digital video signals, to a downstream side circuit, not shown.

The system control micro-computer 18 not only generates flare correction coefficients to be sent to the coefficient generating circuit 12 but also controls the image pickup lens optical system 11, image pickup unit 12, image enhancer 19, process circuit 20 and the transmission/encoder circuit 21.

Figure 4:
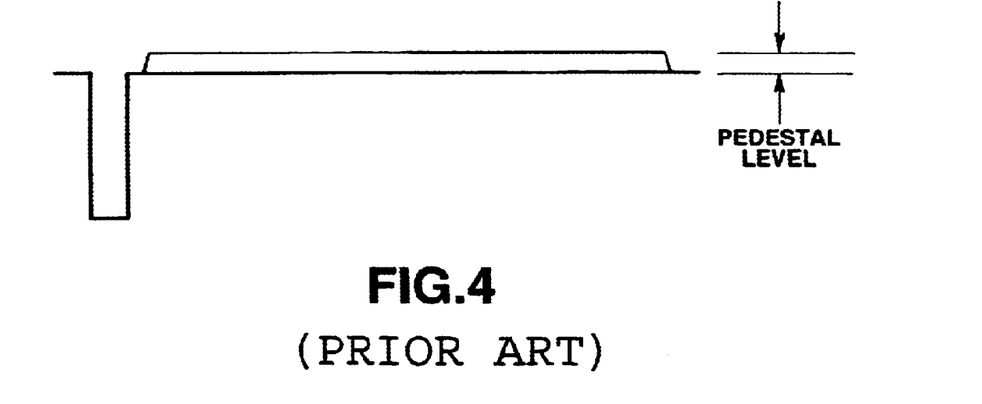
FIG. 4 is a signal waveform used for illustrating the gamma correction of picture signals.

When used in, for example, a broadcasting station, the color video camera 30, described above, is adjusted as follows:

That is, the iris of the image pickup lens optical system 11 is closed and the pedestal level is adjusted to a magnitude prescribed from one broadcasting station to another, as shown in FIG. 4. In general, the three channels of R, G and B are adjusted to the same signal level.

The iris is then opened and the white level of the imaging signals obtained on imaging the gray scale chart shown in FIG. 1 is matched to 100 IRE, as shown in FIG. 2. This sets the black level to approximately 15 IRE.

By flare control of each channel, the black levels of the three channels of R, G and B are matched to the values prescribed from one broadcasting station to another (13 to 17 IRE).

Meanwhile, as an image pickup device provided in the image pickup unit in the above-described color video camera, a solid state imaging device, such as a CCD image sensor, has come to be used in place of a conventional imaging tube.

The CCD image sensor has come to be used as an image pickup device and the image pickup lens has also been improved by reflection inhibiting coating to lower the flare level of the imaging signals themselves.

Notwithstanding, it is a frequent practice used in broadcasting stations to set the black level in the same way as in the video camera employing the conventional imaging tube, in view of interchangeability with the conventional broadcast program resources, even with the video camera having the CCD image sensor as an image pickup device.

That is, if, with the conventional video camera employing the imaging tube, the above-mentioned 11-stage gray scale chart 10 is imaged, the black level is adjusted by flare control so that the signal level of the image pickup signals corresponding to the black level 10B will be 15 to 17 IRE. Similarly, if, with the video camera employing the above-mentioned CCD image sensor, the gray scale chart 10 is imaged, the signal level of the imaging signals corresponding to the black area 10B is adjusted by flare control to be equal to 15 to 17 IRE by flare control.

In the case of the video camera employing the CCD image sensor, the signal level of 15 to 17 IRE controls the coefficients in a direction of reversely floating (raising) the signal level of the dark portion responsive to the APL rather than correcting the flare. That is, if the flare correction coefficient is set to a negative value as indicated by a broken line in the drawing, the signal level of the dark portion is floated to a level more than is necessary for high APL.

That is, if, in a video camera employing the above-mentioned CCD image sensor, the conventional flare correction technique of subtracting the product of the APL with the flare correction coefficient, herein of a negative value, from the original imaging signals, optimum flare correction cannot be achieved. That is, if the incident light volume is relatively low, as when imaging the gray scale, there is raised no particular problem. However, if the APL is of an extremely large value, as when relaying signals outdoors, the flare correction function of preventing floating of the signal level of the dark portion is not in regular operation, but rather operates in a direction of additionally floating the signal level of the dark portion.

DISCLOSURE OF THE INVENTION

It is therefore an object of the present invention to provide a correction method and apparatus capable of performing optimum flare correction even with the use of the CCD image sensor as an image pickup device, and a video camera having the flare correcting finction.

For accomplishing the above object, the present invention provides a correction apparatus for imaging signals including average signal level detection means for detecting average signal levels of imaging signals obtained by an image pickup device, setting means for permitting a user to optionally set a plurality of correction levels associated with a plurality of the average signal levels, correction signal generating means for generating correction signals specifying correction levels, based on the information as set by the setting means, from the average signal level as detected by the average signal level detection means, and subtraction means for subtracting the correction signals from the imaging signals obtained by the image pickup device.

The present invention also provides a correction method for imaging signals including a step of detecting an average signal level of imaging signals obtained by an image pickup device, a step of permitting a user to optionally set a plurality of correction levels associated with a plurality of average signal levels, a step of generating a correction signal specifying a correction level from the detected average signal level based on the as-set information, and a step of subtracting the correction signal from imaging signals obtained by the image pickup device.

The present invention also provides a video camera including image pickup means for imaging an object by an image pickup device, average signal level detection means for detecting the average signal level of imaging signals obtained by the image pickup device, setting means for permitting a user to optionally set a plurality of correction levels associated with a plurality of the average signal levels, correction signal generating means for generating correction signals specifying correction levels, based on the information as set by the setting means, from the average signal level as detected by the average signal level detection means, and subtraction means for subtracting the correction signals from the imaging signals obtained by the image pickup device.

BEST MODE FOR CARRYING OUT THE INVENTION

Referring to the drawings, preferred embodiments of the present invention will be explained in detail.

Figure 7:
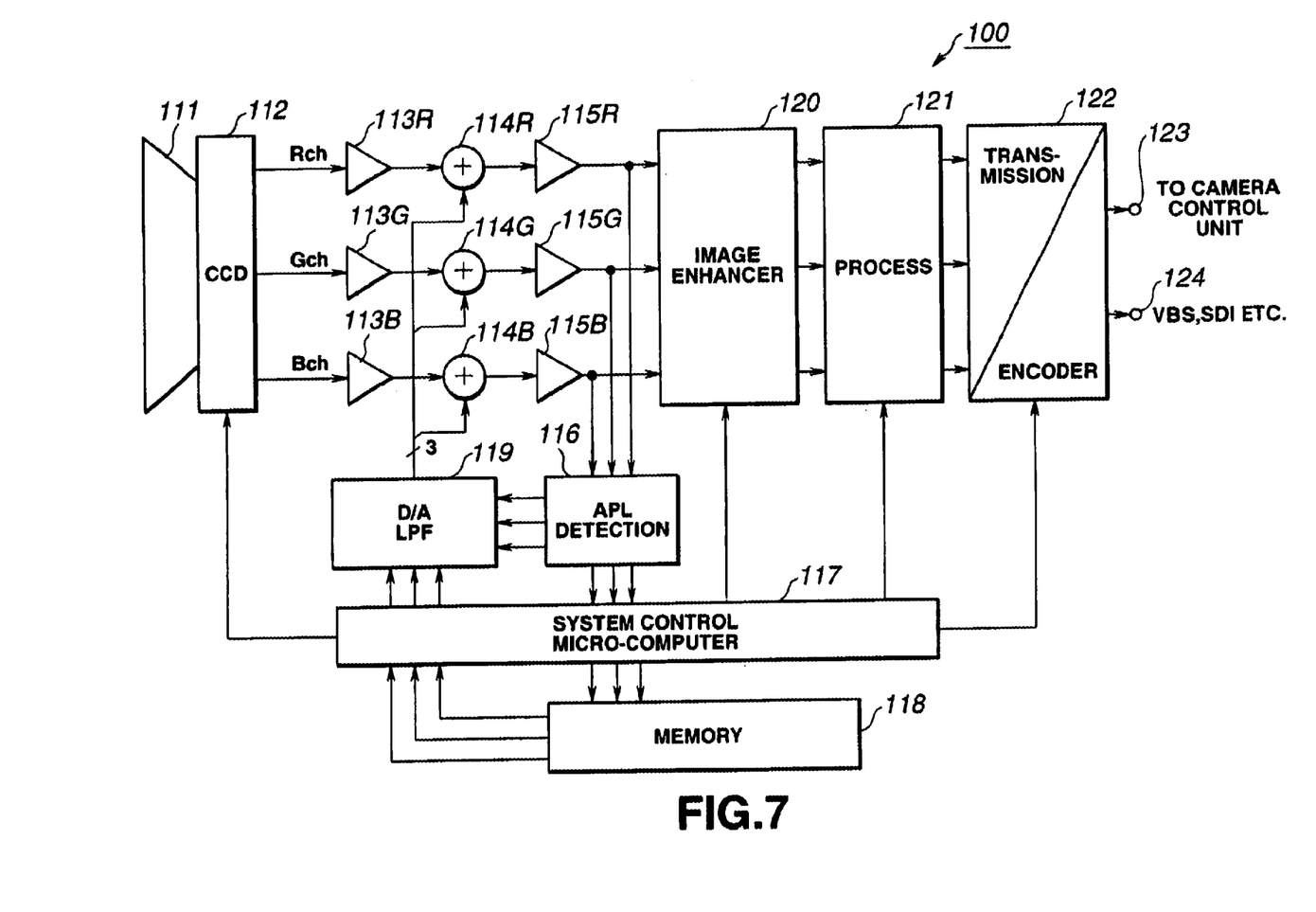
FIG. 7 is block circuit diagram showing an illustrative structure of a color video camera embodying the present invention.

The present invention is applied to a color video camera 100 configured for example as shown in FIG. 7.

In the color video camera 100, shown in FIG. 7, the present invention is applied to so-called three CCD type color video camera adapted to image a color picture by three CCD image sensors, not shown, provided in an image pickup unit 112 on which is incident the light from an object via an imaging lens optical system 111.

In this color video camera 100, the light from an object, incident via imaging lens optical system 111 on the image pickup unit 112, is separated by a color separation prism, not shown, in the image pickup unit 112 into three prime colors of red (R), green (G) and blue (B), these three light beams of R, G and B falling on three CCD image sensors, not shown, arranged in association with the three CCD image sensors, also not shown. The three CCD image sensors, associated with R, G and B, convert the three light beams of R, G and B into electrical signals (imaging signals of the respective color components). The imaging signals of the respective color components from the three CCD image sensors are amplified by amplifiers in the image pickup unit 112 to required signal levels and outputted.

The R, G and B imaging signals, outputted by the image pickup unit 112, are entered to associated variable gain amplifiers 113R, 113G and 113B where white balance is adjusted so that the white portion of the object will be of correct white color, that is so that the imaging signals of the respective colors obtained from the white portion of the object when converted subsequently into picture signals will give picture signals of the correct white color. The image signals outputted by the variable gain amplifiers 113R, 113G and 113B are entered to adders 114R, 114G and 114B.

Output signals of the adders 114R, 114G and 114B are sent via associated amplifiers 115R, 115G and 115B to an APC detection circuit 116 and to an image enhancer 120.

The APL detection circuit 116 integrates imaging signals of the respective color components R, G and B for several frames to detect the average picture level APL of the signal levels of the imaging signals associated with respective color components and converts the APLs of the respective color components into analog/digital (A/D) signals. The APL data for the respective color components, A/D converted after detection by the APC detection circuit 116, are sent to the system control micro-computer 117. That is, with the present color video camera 100, the analog APL signals are converted into digital APL data that can be handled by the system control micro-computer 117.

The system control micro-computer 117 refers to the table of the APL versus flare correction level table stored in the memory 118 to read out the flare correction data corresponding to the APL data from the memory 118.

Since the color video camera 100 has stored therein the flare correction data as table in the memory 118, optional flare correction levels can be set to positive or negative values with respect to the APL by pre-setting the flare correction data to optional value that can take positive or negative values with respect to the APL. The specified method for generating the flare correction data stored in the table of the memory 118 will be explained subsequently.

The flare correction data, read out by the system control micro-computer 117 from the table of the memory 118, are sent to the D/A-LPF circuit 119. This D/A-LPF circuit 119 convert the flare correction data by digital/analog (D/A) conversion and low-pass-filters the resulting analog signals by a low-pass filter. This low-pass filter is provided for removing high-frequency components produced on D/A conversion. The signals obtained on D/A conversion of the flare correction data and on low-pass filtering for removing the high-frequency components represent the flare correction signals.

The flare correction data specifying the flare correction level for respective color components obtained from the D/A-LPF circuit 119 are sent to the adders 114R, 114G and 114B fed with the imaging signals from the variable gain amplifiers 113R, 113G and 113B, that is the original imaging signals. The adders 114R, 114G and 114B add the flare correction signals to the original imaging signals to perform flare correction. The output signals of the adders 114R, 114G and 114B are adjusted for level by the associated amplifiers 115R, 115G and 115B and thence sent to the APC detection circuit 116 and to the image enhancer 120.

The image enhancer 120 is used, if need be, to emphasize the edges of the image contour to improve the picture quality. The signals of the respective color components, improved in picture quality by the image enhancer 120 by way of contour enhancement, are sent to a process circuit 121 in which the picture signals are processed with knee correction, gamma correction or white clipping, and thence sent to the tracking loop switching control circuit 122 of the next stage.

The transmitting portion of the tracking loop switching control circuit 122 is used to transmit the signals imaged by the camera to the camera control unit (CCU), not shown, while the encoder portion is used to process the imaging signals of the respective color components of R, G and B for conformity to respective signal standards. The signals of the transmitting portion are sent to the camera control unit, while picture signals from the encoding portion are sent via terminal 124 to a video tape recorder of the downstream stage, not shown, as VBS signals, that is analog composite video signals or SDI signals, that is serial digital video signals.

The system control micro-computer 117 not only reads out flare correction data from the table of the memory 118 to send the read-out data to the DA-LPF circuit 119 but also controls the imaging lens optical system 111, imaging unit 112, image enhancer 120, process circuit 121 and the transmission/encoder circuit 122.

The table of the memory 118 in the present color video camera 100 repeats the process of previously imaging an actual picture, simultaneously adjusting the APL and flare correction level to an appropriate value, storing the APL and the flare correction level in this state, and finding and storing the flare correction level in a similar manner under different conditions, such as on opening the lens stop further. By specifying n coordinates (0, 0), (X1, Y1), (X2, y2), . . . where n is an integer, with n≧2, the flare correction level Y is represented as a (n−1)st polynomial of the APL values X passing through the points of these conditions:

$$Y = aX^{n-1} + bX^{n-1} + \ldots$$

where the 0th order coefficient of X is 0, and a, b, . . . in the above equation are found by a simultaneous equation.

Figure 8:
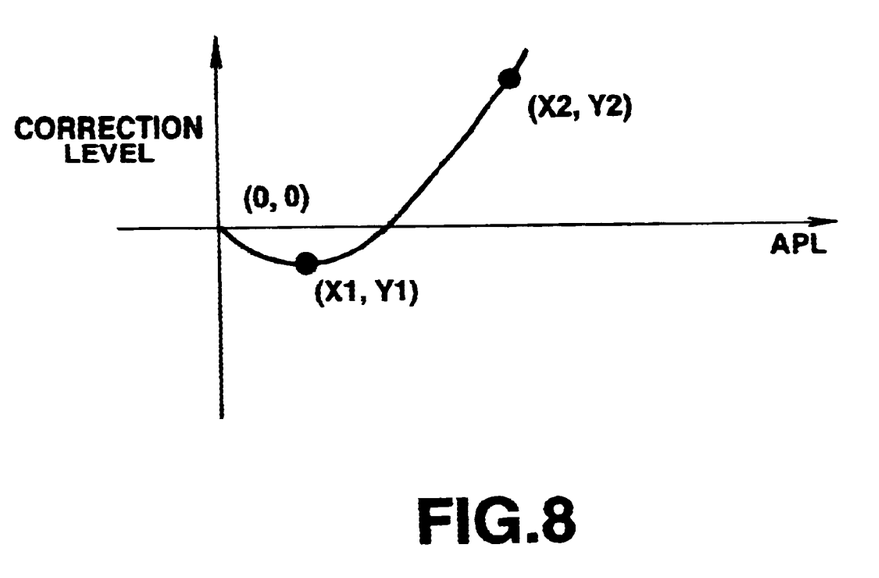
FIG. 8 is a graph for illustrating the setting of the flare correction table and the function of the correction level in the color video camera embodying the present invention.

The finction for calculating the flare correction level of the table of the memory 118 can be easily set by consulting an actual picture pattern using the above method. The relation between the flare correction level thus set and the APL is shown in FIG. 8 in which the ordinate and the abscissa denote the flare correction level and the APL values, respectively. As may be seen from FIG. 8, the flare correction level for the APL can be set to optional positive or negative values. Meanwhile, a curve in FIG. 8 shows an example of flare correction by a quadratic curve passing three points (0, 0), (X1, Y1) and (X2, Y2), of which the coordinates (X1, Y1) and (X2, Y2) can be specified as the operator views an actual picture.

In the color video camera 100 shown in FIG. 8, flare correction data are read out from the table of the memory 118 by the system control micro-computer 117 to send the read-out data to the DA-LPF circuit 119. Alternatively, the same objective as that for the color video camera 100 shown in FIG. 7 can be achieved by providing a computing circuit 218 in place of the memory 118 as in a color video camera 200 shown in FIG. 9 and by carrying out computations in accordance with the finction of the pre-set APL versus flare correction level by this computing circuit 218. In this color video camera 200, the component parts which are the same as those of the color video camera 100 are denoted by the same reference numerals and the corresponding description is omitted for clarity.

Figure 9:
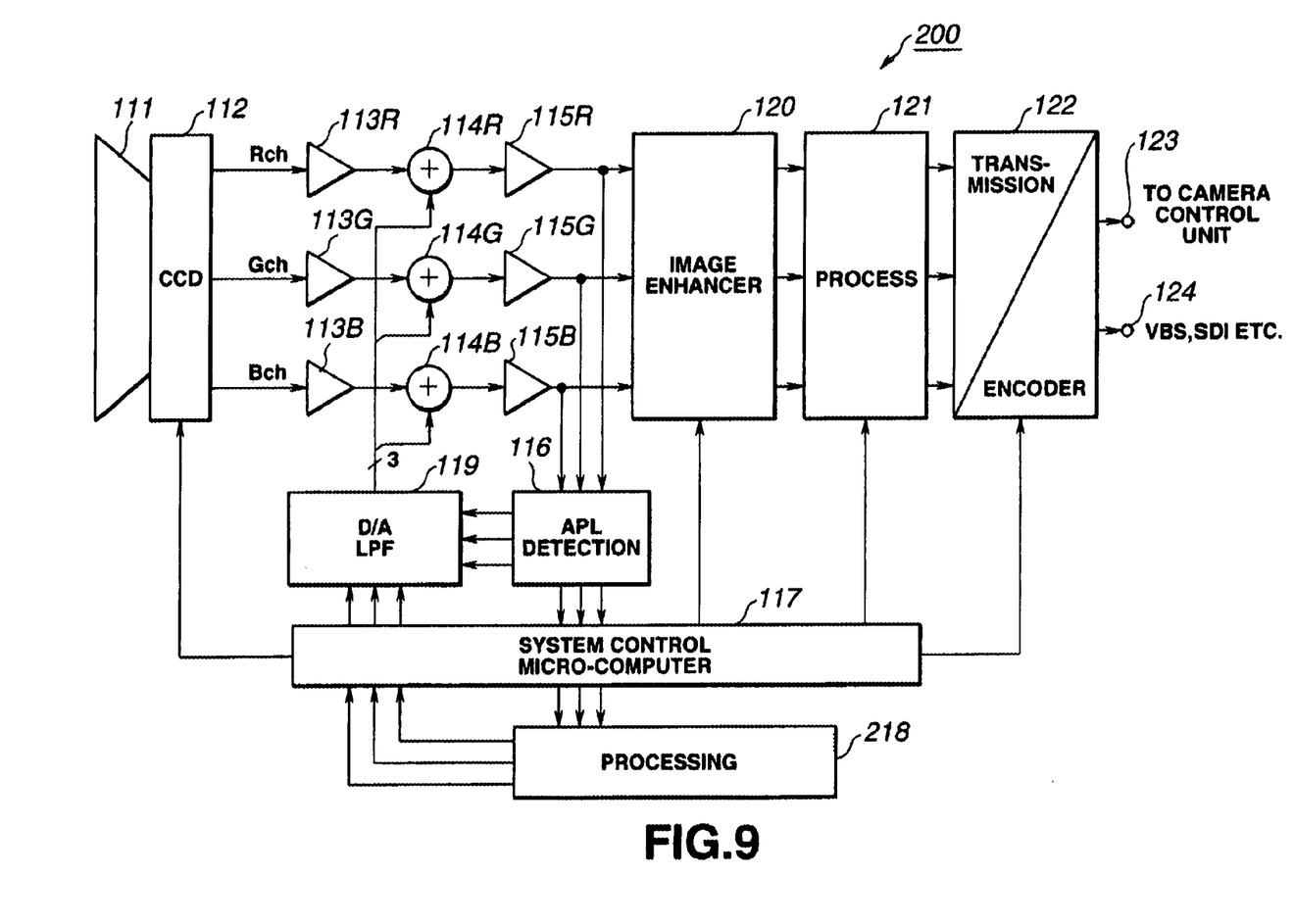
FIG. 9 is a block circuit diagram showing another illustrative structure of a color video camera embodying the present invention.

That is, in the present color video camera 200, the APLs are detected by an APL detection circuit 116 as in the color video camera 100. The APL data for the three color components of R, G and B, detected by the APL detection circuit 116, are sent to the computing circuit 218 via system control micro-computer 117.

This computing circuit 218 computes the flare correction level Y represented by the above (n−1) order polynomial in accordance with the function of APL versus flare correction level to generate flare correction data.

The flare correction data generated by the computing circuit 218 are sent via system control micro-computer 117 to the DA-LPF circuit 119.

In an actual imaging site, the flare correction level is usually set in advance of start of the imaging operations. In particular, for drama production for which delicate follow-up is required, it is frequently practiced to make fine adjustment of the pre-set flare correction level during imaging.

In the video camera 100, 200, shown in FIGS. 7 and 9, the function of flare correction in the conventional video camera 300 as explained with reference to FIG. 5 may be loaded to make fine adjustment of the pre-set flare correction level during imaging.

Figure 10:
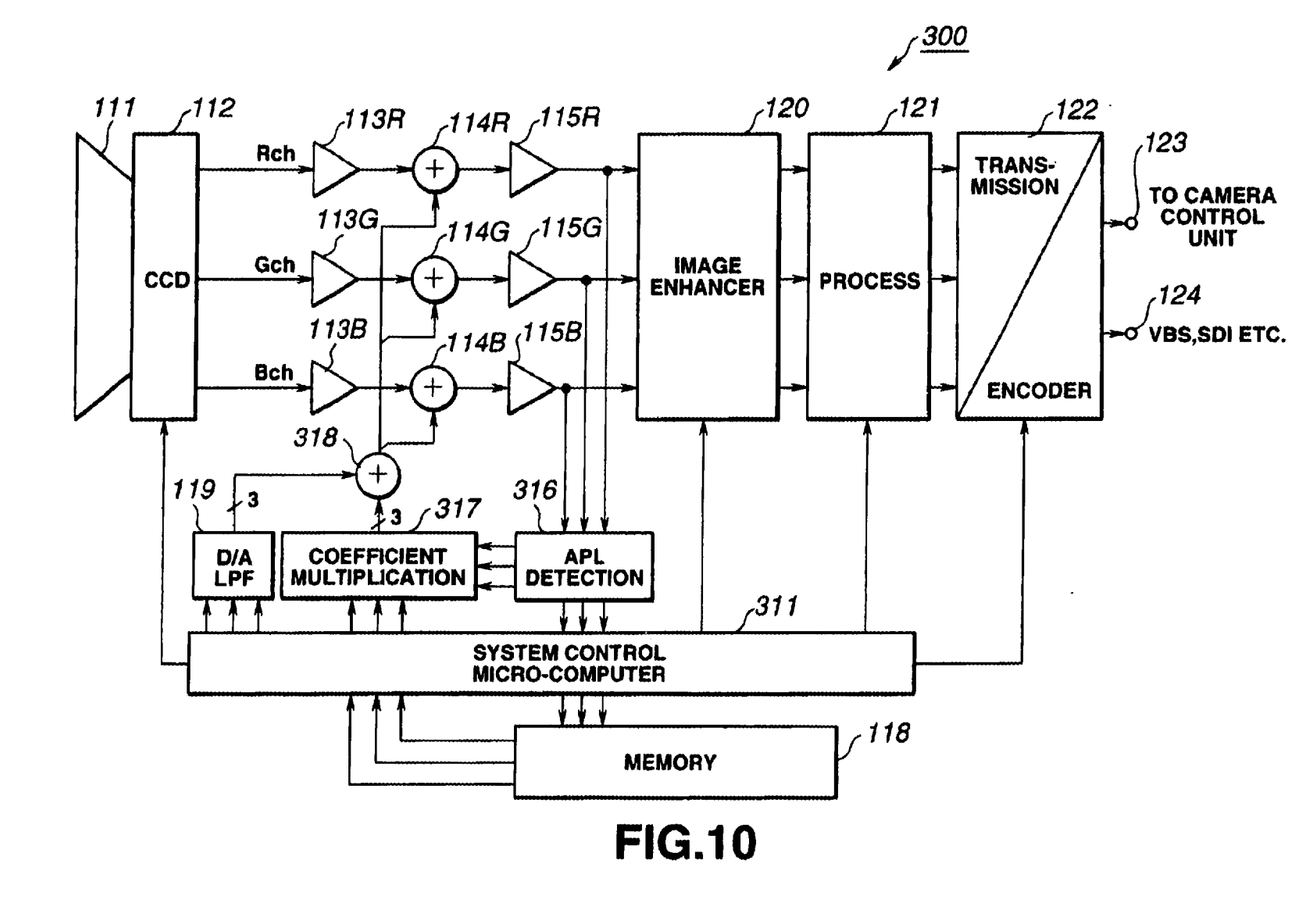
FIG. 10 is a block circuit diagram showing yet another illustrative structure of a color video camera embodying the present invention.

FIG. 10 shows the structure of the video camera 300 corresponding to the color video camera 100 of FIG. 7 also carrying the flare correction function in the conventional color video camera 100 shown in FIG. 7. In the video camera 300 shown in FIG. 10, the component parts similar to those of the color video camera 100 shown in FIG. 7 are denoted by the same reference numerals and are not explained specifically.

This video camera 300 includes a coefficient multiplication circuit 317 for multiplying the APL signals of the respective color components as detected by the APL detection circuit 316 with a flare correction coefficient corresponding to the color components sent from a system control micro-computer 311 and an adder 218 for summing the flare correction signals corresponding to the respective color components obtained from the coefficient multiplication circuit 317 to the flare correction signal obtained from the DA-LPF circuit 119.

The APL detection circuit 316 integrates imaging signals of the respective color components R, G and B sent from the adders 114R, 114G and 114B via amplifiers 15R, 115G and 115B for several frames to detect the average picture level of the signal levels of the image signals of the color components R, G and B to send the APL signals of the respective color components to the coefficient multiplication circuit 317 to convert the APL signals of the respective color components. In addition, the APL detection circuit 316 converts the APL signals of the color components into analog/digital (A/D) signals to send the APL data corresponding to the respective color components to a system control micro-computer 317.

The system control micro-computer 317 reads out the flare correction data corresponding to the respective color components from the table of the memory 118 based on the APL data to send the read-out data to the D/A-LPF circuit 117 while supplying the flare correction coefficient corresponding to the color components to the coefficient multiplication circuit 317. The computing circuit 218 may also be used in place of the memory 118.

The coefficient multiplication circuit 317 multiplies the flare correction coefficient corresponding to the color components sent from the system control microcomputer 311 with the APL signals as found from color component to color component to generate the flare correction signals for the respective color components.

The adder 318 adds the flare correction signal from the D/A-LPF circuit 12 to the flare correction signal from the coefficient multiplication circuit 317 to adjust the flare correction level. The flare correction signal obtained by the ader 29 is sent to the adders 114R, 114G and 114B fed with the original imaging signals. This allows the adders 114R, 114G and 114B to perform flare correction by summing the flare correction signal to the original imaging signals.

What is claimed is:

1. A correction apparatus for imaging signals comprising:
average signal level detection means for detecting average signal levels of imaging signals obtained by an image pickup device;
setting means for permitting a user to optionally set a plurality of correction levels associated with a plurality of the average signals levels;
correction signal generating means for generating correction signals specifying correction levels, based on the information as set by said setting means, from the average signal level as detected by said average signal level detection means;
wherein said correction signal generating means designate n coordinates (0,0), (X1, X2), (X2, Y2), . . . , including an origin coordinate (0,0) with the average signal level of 0 and a correction level of 0, where n is an integer, with n≧2, to express a correction level Y as a (n−1) order polynomial of the average signal level X passing through these coordinates, to generate correction signals based on said polynomial; and
subtraction means for subtracting said correction signals from the imaging signals obtained by said image pickup device.

2. The correction apparatus according to claim 1 wherein said correction signal generating means includes storage means for storing sets of the plural average signal levels as set by said setting means and the correction levels as a table made up of the average signal levels and the correction levels in accordance with preset calculation formulas, and correction signal outputting means for reading out correction levels corresponding to the average signal level from the average signal level detection means from said table at the time of imaging for outputting the correction level as correction signals.

3. The correction apparatus according to claim 1 further comprising:
average signal level varying means for varying said average signal level.

4. The correction apparatus according to claim 3 wherein said average signal level varying means is a mechanical iris.

5. The correction apparatus according to claim 1 wherein said plural correction levels include correction levels of both the positive and negative polarities.

6. The correction apparatus according to claim 1 further comprising:
coefficient multiplication means for multiplying the average signal level with a preset correction coefficient, and correction level adjustment means arranged between said coefficient multiplication means and said subtraction means for adjusting the correction signals generated by said coefficient multiplication means with correction signals generated by said correction signal generating means.

7. A correction apparatus for imaging signals comprising:
average signal level detection means for detecting average signal levels of imaging signals obtained by an image pickup device;
setting means for permitting a user to optionally set a plurality of correction levels associated with a plurality of the average signals levels;
correction signal generating means for generating correction signals specifying correction levels, based on the information as set by said setting means, from the average signal level as detected by said average signal level detection means;
wherein said correction signal generating means includes storage means for generating a calculation formula made up of average signal levels versus correction levels in accordance with a preset calculation formula based on sets of the plural average signal levels as set by said setting means and the correction signal outputting means for generating correction signals by said calculation formula based on the average signal level from the average signal level detection means at the time of imaging for outputting the correction signals; and
subtraction means for subtracting said correction signals from the imaging signals obtained by said image pickup device.

8. A correction method for imaging signals comprising:
a step of detecting an average signal level of imaging signals obtained by an image pickup device;
a step of permitting a user to optionally set a plurality of correction levels associated with a plurality of the average signals levels;
a step of generating a correction signal specifying a correction level from the detected average signal level based on the as-set information;
wherein said step of generating said correction signals designate n coordinates (0,0), (X1, X2), (X2, Y2), . . . , including an origin coordinate (0,0) with the average signal level of 0 and a correction level of 0, where n is an integer, with n≧2, to express a correction level Y as a (n−1) order polynomial of the average signal level X passing through these coordinates, to generate correction signals based on said polynomial; and
a step of subtracting said correction signals from the imaging signals obtained by said-image pickup device.

9. A correction method for imaging signals comprising:
a step of detecting an average signal level of imaging signals obtained by an image pickup device;
a step of permitting a user to optionally set a plurality of correction levels associated with a plurality of the average signals levels;
a step of generating a correction signal specifying a correction level from the detected average signal level based on the as-set information;
wherein said step of generating said correction signals is a step of multiplying said average signal level with a preset correction coefficient to generate a first correction signal and summing to said first correction signal a second correction signal specifying a correction level conforming to a function of the average signal level versus correction level to generate a third correction signal; and a step of subtracting said correction signals from the imaging signals obtained by said image pickup device.

10. A video camera comprising:

image pickup means for imaging an object by an image pickup device;

average signal level detection means for detecting average signal level of imaging signals obtained by an image pickup device;

setting means for permitting a user to optionally set a plurality of correction levels associated with a plurality of the average signal levels;

correction signal generating means for generating correction signals specifying correction levels, based on the information as set by said setting means, from the average signal level as detected by said average signal level detection means;

wherein said correction signal generating means designate n coordinates (0,0), (X1, X2), (X2, Y2), . . . , including an origin coordinate (0,0) with the average signal level of 0 and a correction level of 0, where n is an integer, with n≧2, to express a correction level Y as a (n−1) order polynomial of the average signal level X passing through these coordinates, to generate correction signals based on said polynomial; and subtraction means for subtracting said correction signals from the imaging signals obtained by said image pickup device.

11. The video camera according to claim 10 wherein said correction signal generating means includes storage means for storing sets of the plural average signal levels as set by said setting means and the correction levels, as a table made up of the average signal levels and the correction levels, in accordance with preset calculation formulas, and correction signal outputting means for reading out correction levels corresponding to the average signal level from the average signal level detection means from said table at the time of imaging for outputting the correction level as correction signals.

12. The video camera according to claim 10 further comprising:

coefficient multiplication means for multiplying the average signal level with a preset correction coefficient, and correction level adjustment means arranged between said coefficient multiplication means and said subtraction means for adjusting the correction signals generated by said coefficient multiplication means with correction signals generated by said correction signal generating means.

13. The video camera according to claim 10 wherein said image pickup means images an object by plural image pickup devices by color imaging to output three-channel imaging signals;

said average signal level detection means, correction signal generating means and said subtraction means performing signal processing on the three-channel imaging signals in three channels.

14. A video camera comprising:

image pickup means for imaging an object by an image pickup device;

average signal level detection means for detecting average signal level of imaging signals obtained by an image pickup device;

setting means for permitting a user to optionally set a plurality of correction levels associated with a plurality of the average signal levels;

correction signal generating means for generating correction signals specifying correction levels, based on the information as set by said setting means, from the average signal level as detected by said average signal level detection means;

wherein said correction signal generating means includes storage means for generating a calculation formula, made up of average signal levels versus correction levels, in accordance with a preset calculation formula, based on sets of the plural average signal levels as set by said setting means and the correction signal outputting means for generating correction signals by said calculation formula based on the average signal level from the average signal level detection means at the time of imaging for outputting the correction signals; and subtraction means for subtracting said correction signals from the imaging signals obtained by said image pickup device.

* * * * *